United States Patent [19]

Kobayashi et al.

[11] 4,393,417
[45] Jul. 12, 1983

[54] TRACKING SYSTEM

[75] Inventors: Masaaki Kobayashi, Kawanishi; Akihiro Takeuchi, Ikoma; Kiyoji Fujisawa, Nara, all of Japan

[73] Assignee: Matsushita Electric Industrial Co., Ltd., Osaka, Japan

[21] Appl. No.: 205,599

[22] Filed: Nov. 10, 1980

Related U.S. Application Data

[63] Continuation-in-part of Ser. No. 156,194, Jun. 3, 1980, abandoned.

[30] Foreign Application Priority Data

Jun. 4, 1979 [JP] Japan .................................. 54-70313
Oct. 4, 1979 [JP] Japan ................................. 54-128689
Apr. 22, 1980 [JP] Japan .................................. 55-53260

[51] Int. Cl.$^3$ ........................ H04N 5/78; G11B 21/10
[52] U.S. Cl. .................................... 360/10.3; 360/70; 360/75
[58] Field of Search ..................... 360/10, 11, 14, 70, 360/75, 77, 78, 10.1, 10.2, 10.3, 11.1, 14.1, 14.2, 14.3

[56] References Cited

U.S. PATENT DOCUMENTS

| | | | |
|---|---|---|---|
| 4,011,587 | 3/1977 | Arter et al. | 360/77 X |
| 4,127,881 | 11/1978 | Wakami et al. | 360/70 |
| 4,189,758 | 2/1980 | Morio et al. | 360/77 |
| 4,268,875 | 5/1981 | Morio et al. | 360/10 |
| 4,322,757 | 3/1982 | Hatakeyama | 360/14 |
| 4,356,522 | 10/1982 | Takano et al. | 360/77 |

Primary Examiner—John H. Wolff
Assistant Examiner—Donald McElheny, Jr.
Attorney, Agent, or Firm—Wenderoth, Lind & Ponack

[57] ABSTRACT

A tracking system including positionable elements, rotary video heads mounted on the positionable elements, a control head, a frequency generator attached to a capstan motor, and a displacing pattern generator. The displacing pattern generator includes counters which count the pulses from the frequency generator. The pattern generator is reset by control signals reproduced by the control head, a still pattern generator, and an adding means which adds the output signal from the counters and the output signal from the still pattern generator. The output signal of the displacing pattern generator is amplified and applied to the positionable element. As result, the video head mounted on the positionable element can properly trace on a recorded video track at a normal tape speed or at a different tape speed.

5 Claims, 47 Drawing Figures

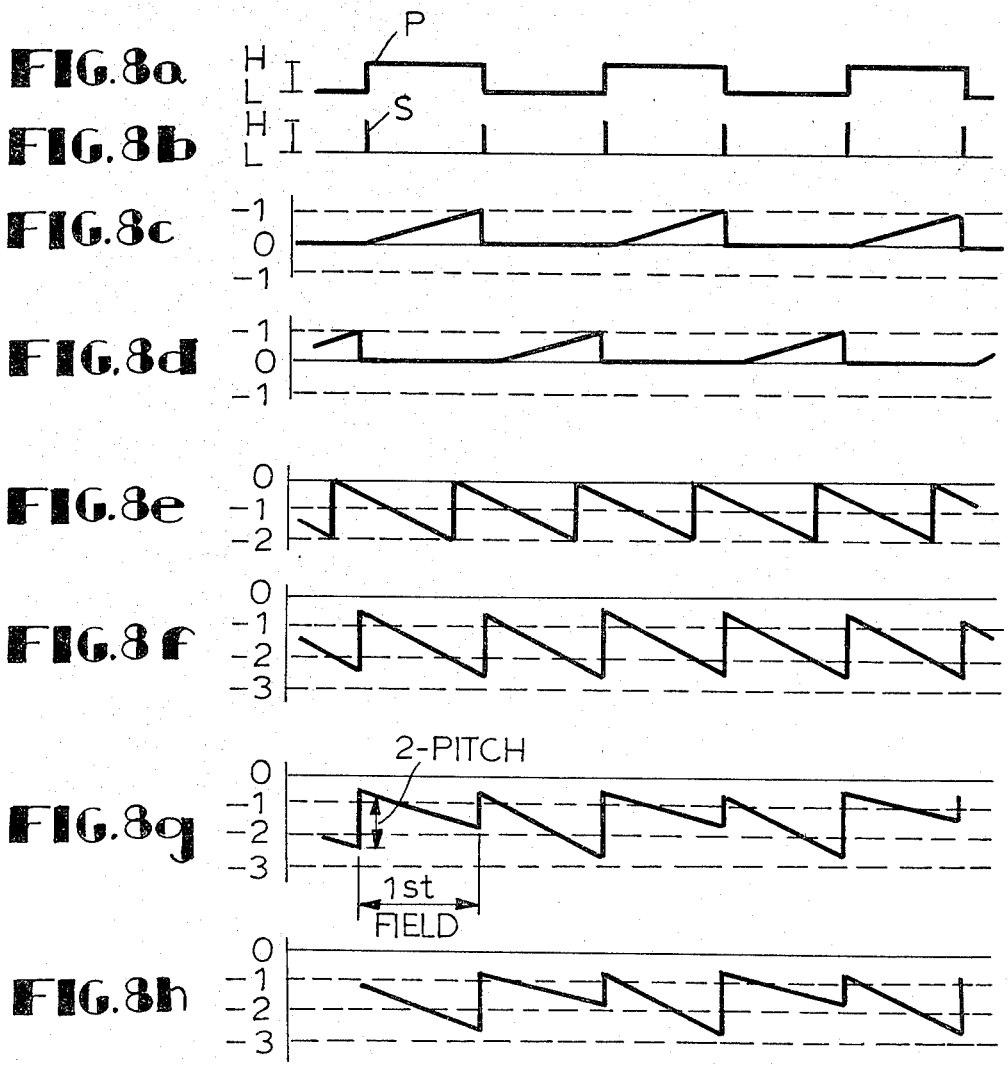

TRACKING SYSTEM

CROSS-REFERENCE TO RELATED APPLICATIONS

This application is a continuation-in-part of application Ser. No. 156,194, filed June 3, 1980 now abandoned.

BACKGROUND OF THE INVENTION

This invention generally relates to a tracking system which is employed in a video tape recorder/reproducer, and more particularly to a system for generating a displacing pattern signal applied to a positionable element on which a video head is mounted so as to maintain the video head in substantially undeviating configuration with respect to a recorded video track.

Recently, an automatic tracking system has been introduced for a video tape recorder/reproducer. Such a system makes possible the proper tracking of the video track recorded on a video tape, reproducing no noise band pictures regardless of the tape speed mode, (for example, normal speed mode, slow motion mode, still motion mode, quick motion mode, reverse motion mode, etc.).

In the conventional automatic tracking system, video heads are mounted on respective positionable elements such as piezoelectric elements. Each positionable element is dithered by a signal from an oscillator. The tracking error signals are detected from the envelope of reproduced signals. According to the resultant tracking error signal, a negative feedback (NFB) loop controls the positionable element so that the video head properly follows the recorded track.

In the case of the automatic tracking system described above being applied to a video recorder/reproducer employing a narrow video track width, (for example, a 20 micrometer track width), the displacing amplitude of the video head due to the dither signal is restricted to a range of a few micrometers.

Accordingly, the tracking error signal obtained from the envelope signal is a signal having a very low SN ratio. To improve the low SN ratio of the tracking error signal, it is necessary to use a L.P.F. having a very low cutoff frequency in the NFB loop. Since the transient response of the NFB loop is limited by the L.P.F., some noise bars appear on the reproduced pictures during a reproduction mode change.

SUMMARY OF THE INVENTION

Accordingly, an object of this invention is to provide a tracking system for a video recorder/reproducer.

Another object of this invention is to provide an accurate displacing pattern signal for a tracking system having a positionable element.

A further object of this invention is to provide an accurate displacing pattern signal for a tracking system having a positionable element without regard to the tape speed or video track width.

Primarily, a tracking system of this invention comprises: transducing means for reproducing video signals recorded along said track on said record medium; positionable means having said transducing means mounted at a location thereon, said positionable means being movable at said location for displacing the position of said transducing means; control signal reproducing means for reproducing said control signals recorded along said track on said record medium; means for dividing the interval of said control signals, said dividing means generating sub-control signals which are representative of the transported length of said record medium; a rotating phase detector for detecting the rotating phase of said transducing means; an operational means for generating a displacement pattern signal which is representative of the location of said video track recorded on said record medium with respect to said transducing means by using the output of said control signal reproducing means, said sub-control signals, and the output of said rotating phase detector; and means for supplying said displacement pattern signal to said positionable means, whereby said transducing means is capable of tracking properly on said recorded video track regardless of the transporting speed of said record medium.

BRIEF DESCRIPTION OF THE DRAWINGS

FIGS. 8a-8h show the signal waveforms at various points of the circuit of FIG. 7.

DESCRIPTION OF THE PREFERRED EMBODIMENT

The following is a description of a preferred embodiment of this invention.

Figure 1:
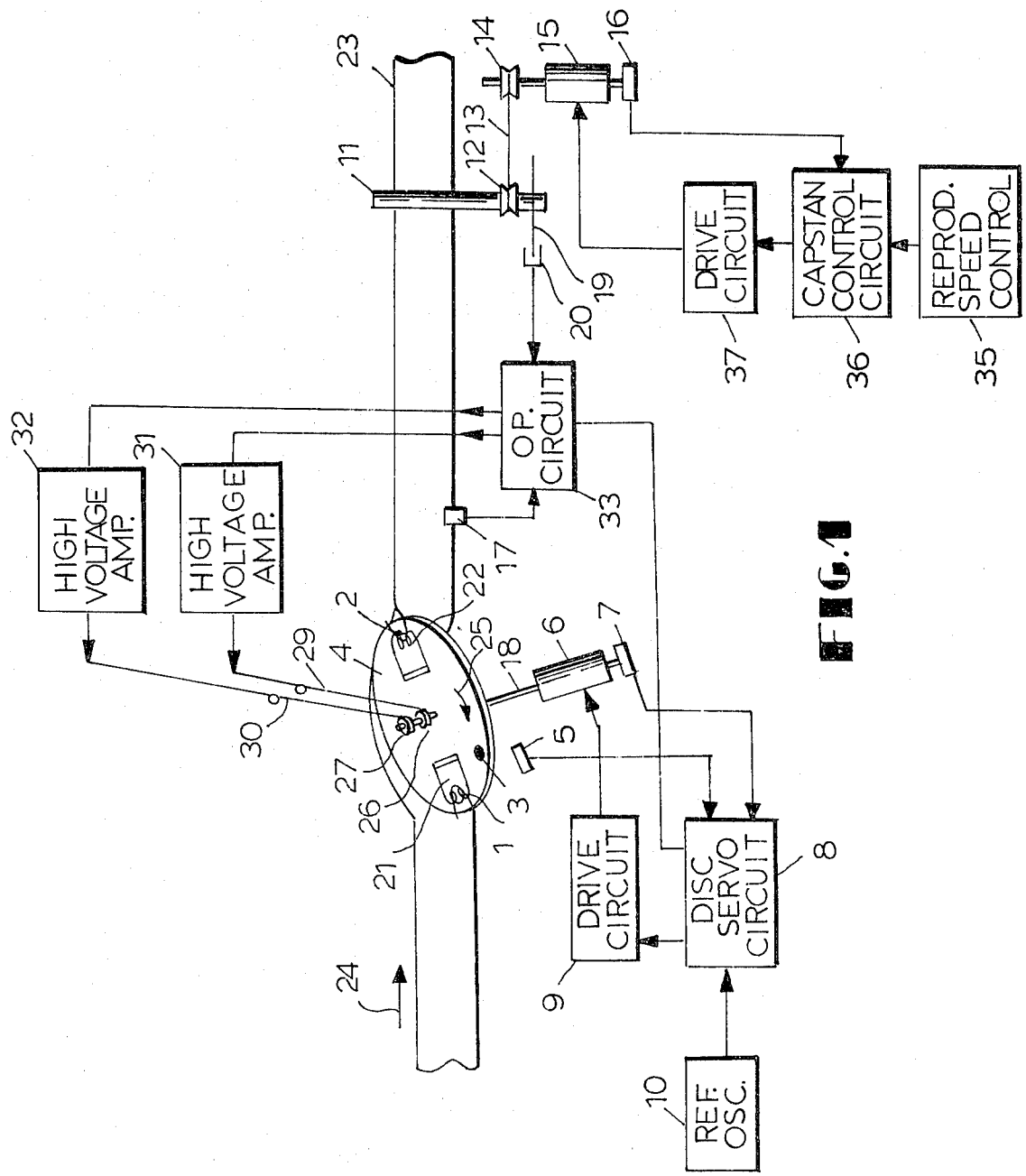
FIG. 1 is a block diagram of an embodiment of a video tape recorder using a tracking system according to this invention.

FIG. 1 shows a construction of a video tape recorder (in the reproducing mode) using the tracking apparatus of this invention. Video heads 1 and 2 have the same azimuth angle (for example, 6°). The video heads 1 and 2 are mounted at the free end of positionable elements 21 and 22 (for example, bimorph type piezoelectric elements). The other ends of elements 21 and 22 are fixed to a rotary disk 4. A magnet 3 indicates the rotating phase of the video heads 1 and 2, and is attached to the rotary disk 4. A rotating phase detector 5, which is magnetically coupled to the magnet 3, is mounted in a stationary position. The rotary disk 4 is driven by a DC motor 6, and the direction of rotation is indicated by the arrow 25.

The output signal of a frequency generator (FG) 7, which is mounted on the shaft of the DC motor 6, is supplied to a disk servo circuit 8. The output signals of the rotating phase detector 5 and a reference oscillator 10 are supplied to the disk servo circuit 8. The output signal of the disk servo circuit 8 is supplied to the DC motor 6 through a drive circuit 9. By these means, the rotating phase control of the rotary disk 4 is achieved.

A magnetic tape 23 is driven by a capstan 11 and a pinch-roller (not shown). The driven direction of the tape 23 is indicated by an arrow 24. The capstan 11 is driven by a DC motor 15 through a pulley 12, a belt 13, and a pulley 14. The output signal of a frequency generator (FG) 16 which indicates the rotational speed of the DC motor 15, and the output signal of a reproduction tape speed controller 35 is supplied to a capstan control circuit 36, whose output is fed to a drive circuit 37. The drive circuit 37 drives the DC motor 15. By these means, the rotational speed of the capstan 11 and consequently the tape speed are controlled.

The output signal of a control head 17 (hereafter, this signal will be designated as control signal R), the output signal of the rotating phase detector 20 and the output signal P of the disk servo circuit 8 are supplied to the operational circuit 33. The angular rotation of the capstan 11 is detected by the combination of a disk having a number of slits 19 attached to the capstan 11 and a rotating phase detector 20. The rotating phase detector 20 generates a pulse in proportion to the angular rotation of the capstan 11. For example, when the reproducing tape speed is the same as that used for recording, an assumption is made that the rotating phase detector 20 is chosen so as to generate ten pulses during the period between successive reproduced control signals R. Since the rotating phase detector 20 generates the same ten pulses regardless of changes in the reproducing tape speed, the spacing period between successive reproduced control signals R is consistently divided into ten divisions. Hereafter, the output pulses of the rotating phase detector 20 will be called sub-control signals Q.

An embodiment of the rotating phase detector 20 described above may be achieved by using a luminous body and a photo detector for detecting the light passing through the slits on the disk 19, but similar output signals may also be obtained by employing a toothed wheel of a magnetic material in place of the slit disk 19 and a corresponding magnetic flux detector in place of the detector 20.

The output signals of the operational circuit 33, which are displacement patterns, are supplied to the high voltage amplifiers 31 and 32, and amplified sufficiently to drive the positionable elements 21 and 22. These amplified signals are supplied to the positionable elements 21 and 22 through conductive brushes 29 and 30, and slip rings 26 and 27. The slip rings are attached to the rotary shaft 18 of the DC motor 6, but are electrically insulated from the shaft 18.

Figure 2:
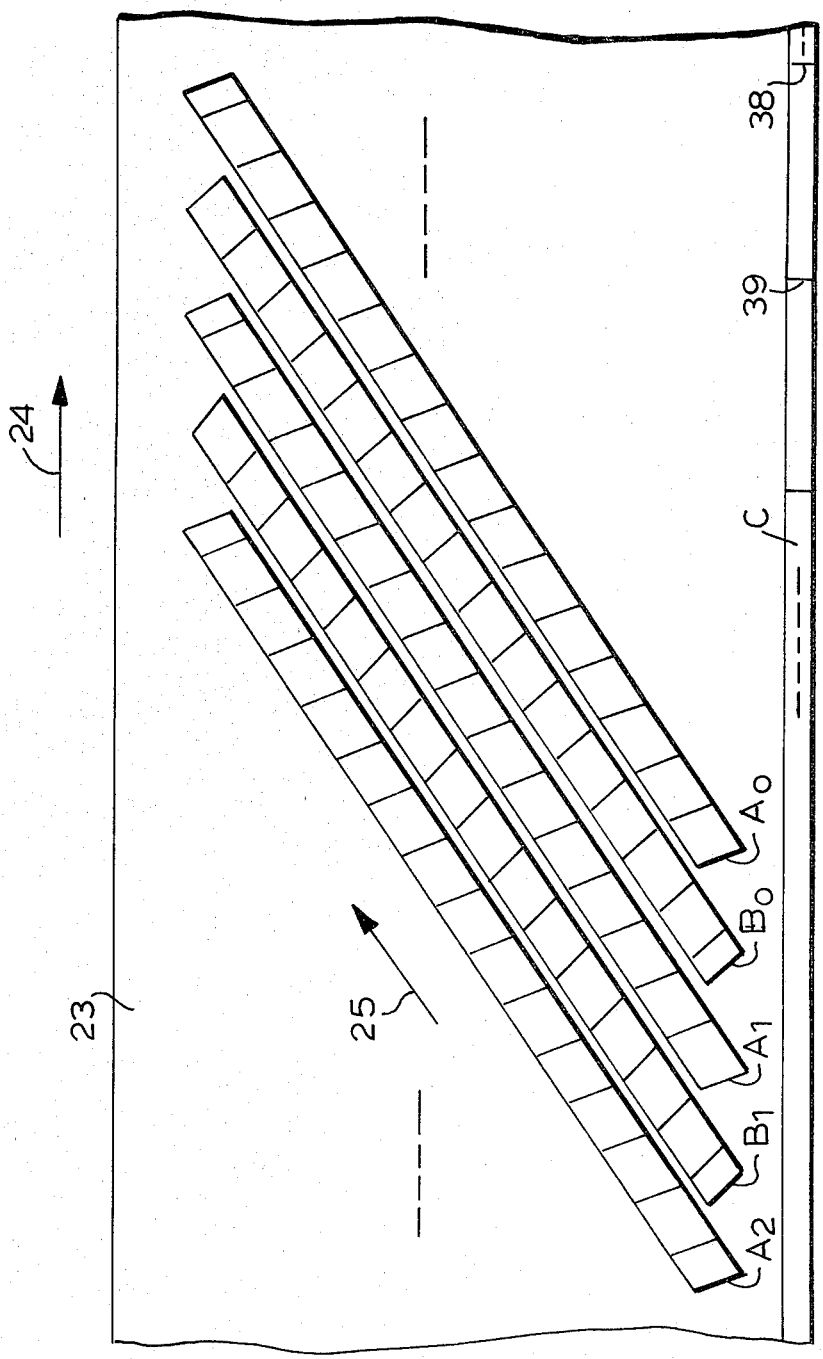
FIG. 2 is a recorded track pattern of a magnetic tape.

FIG. 2 shows the video track pattern recorded on the magnetic tape 23. $A_0$, $B_0$, $A_1$, $B_1$, and $A_2$ are one field video tracks of video signals; the $A_0$, $A_1$ and $A_2$ tracks are recorded by one video head whose azimuth is $+6°$; the $B_0$ and $B_1$ tracks are recorded by another video head whose azimuth is $-6°$. C is the control track. The control signals, which represent the recording phase of the video signals, are recorded on the control track C at the rate of one control signal for every one picture frame. In the recording process, the starting point of $A_0$ track and the control signal 38 are recorded at the same time. The starting point of $A_1$ track and the control signal 39 are recorded at the same time.

Figure 3A:
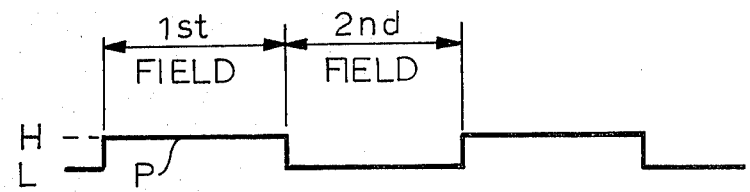
FIGS. 3a-3f illustrate signals appearing at various points of the tracking system shown in FIG. 1.
Figure 3B:
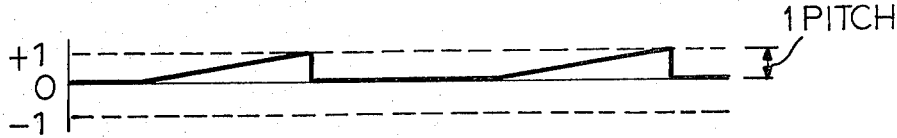

During the reproducing process, when the video head 1 is scanning the starting point of the $A_1$ track, the control head 17 simultaneously reproduces the control signal 39. At that time, it is assumed that the transport magnetic tape 23 is stopped, then the trace end point of the video head 1 is at the end point of the track $B_0$. This scanning period is called the first field. In order to reproduce pictures without noise-bars, the video head 1 must trace the $A_1$ track with an on track condition from its beginning to its end. By supplying the voltage to the piezoelectric element 21 during the first field in a linearly increasing fashion with respect to the scanning, as shown in FIG. 3b, the position of the video head 1 is linearly moved with respect to the scanning, and the video head is capable of following the whole video track. The required movement amplitude is equal to zero at the trace starting point of the $A_1$ track and is equal to one track pitch at the trace end point. The pattern of movement amplitude is called the still pattern.

Figure 4:
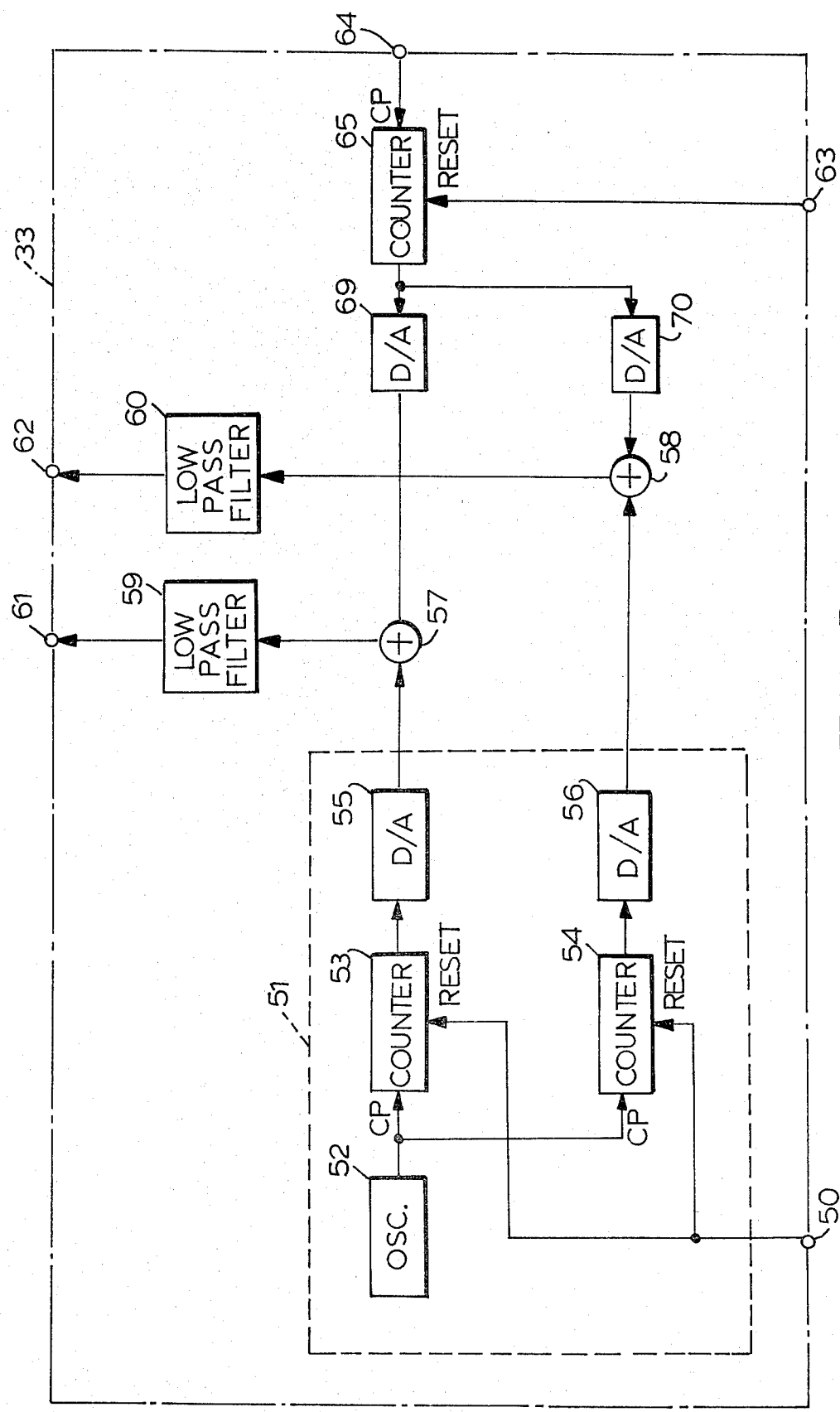
FIG. 4 is a block diagram of an example of operational circuit 33.

The operational circuit 33 which generates the displacing pattern will hereafter be explained. In FIG. 1, the rotating phase of video head 1 is detected by the magnet 3 and the rotating phase detectors. The rotating head phase signals are delayed at the disk servo circuit 8, and the signals P are obtained. The signals P have an H level at the first field as shown in FIG. 3a. The signals P are supplied to the operational circuit 33. A still pattern generator 51, which is part of the operational circuit 33, generates such a movement amplitude signal using the signals P. An embodiment of the operational circuit 33 is shown in FIG. 4. In FIG. 4, the signals P are supplied to the input terminal 50. The still pattern generator 51 consists of an oscillator 52, a counter 53, a counter 54, a D/A (digital-analog) converter 55, and a D/A converter 56. The control signals R reproduced from the control head 17 are supplied to the input terminal 63. The sub-control signals Q supplied from the rotating phase detector 20 are supplied to the input terminal 64. These input signals at the input terminals 50, 63, and 64 are supplied to the still pattern generator 51 and a counter 65. The output signals are derived from output terminals 61 and 62 through a D/A converter 69, a D/A converter 70, an adder 57, an adder 58, a low pass filter 59 and a low pass filter 60.

The following is an explanation of the performance of the operation circuit 33 at a still mode. The oscillator 52 oscillates at a fixed frequency to produce 300 Hz pulse signals, for example. The output pulses of the oscillator 52 are supplied to the CP terminal of the counter 53. A reset terminal of counter 53 is connected to input terminal 50. Counter 53 is activated by an H level of the signals P and is reset by an L level of the signals P. The output signals of counter 53 are supplied to output terminal 61 through D/A converter 55, adder 57 and low pass filter 59.

The waveforms of the output signal are shown in FIG. 3b. If the frequency of the oscillator 52 is 300 Hz and the period of the first field is about 16.6 m sec., about five pulses are supplied to the counter 53 during the first field period. When the video head 1 scans the starting point of the $A_1$ track, the control signal 39 is reproduced and the magnetic tape 23 is stopped. At that time, since counter 65 is reset by the control signal 39, D/A converter 69 generates a zero level signal during the first field, and adder 57 supplies only the output signals of D/A converter 55 as shown in FIG. 3b. These signals are supplied to the piezoelectric element 21 through voltage amplifier 31, conductive brush 29 and slip ring 26. In consequence, the video head 1 can trace the $A_1$ track with an on-track condition during the first field.

Figure 3C:
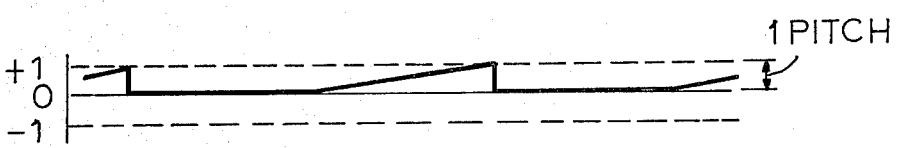

If the magnetic tape 23 remains stopped, the video head 2 begins to scan the $A_1$ track after the video head 1 has scanned the $A_1$ track. The azimuth of the video head 2 is also $+6°$. If the output terminal 62 provides the signals shown in FIG. 3c, the video heads can scan the $A_1$ track with an on-track condition during the second field. The output signals are supplied to the piezoelectric element 22 through high voltage amplifier 32, conductive brush 30 and slip ring 27. In this case, the output pulses of oscillator 52 are counted by counter 54. The signal shown in FIG. 3c is developed at output terminal 62 through D/A converter 56, adder 58 and low pass filter 60. The counter 54 is activated by a L level of the signals P and is reset by an H level of the signals P. Since the magnetic tape 23 remains stopped, only the output signal of D/A converter 56 is supplied to adder 58. The signals as shown in FIG. 3b and in FIG. 3c are called the still pattern.

The above description is concerned with the case in which the control signal 39 is reproduced by the control head, and the magnetic tape 23 stops instantaneously.

The following is an explanation of the case in which the magnetic tape 23 stops when five sub-control signals Q are counted after the control signal 38 is reproduced. The still pattern generator 51 supplied the still pattern shown in FIG. 3b or FIG. 3c to adder 57 or an adder 58 according to the rotating phase of video head 1 or 2, regardless of the tape speed of the magnetic tape 23. Since ten sub-control signals Q are counted during the period between successive control signals, the fact that tape 23 stops after five sub-control signals Q are counted corresponds to the situation in which the starting point of video heads 1 and 2 is the start of the $B_1$ track and the end point of video heads 1 and 2 is the end of the $A_1$ track.

Figure 3D:
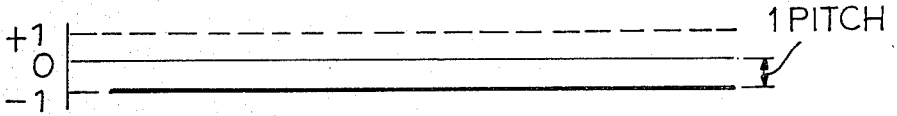
Figure 3E:
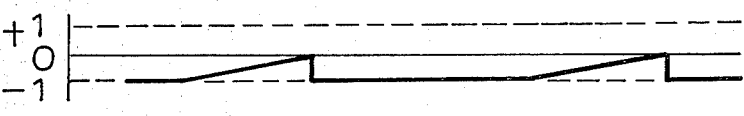
Figure 3F:
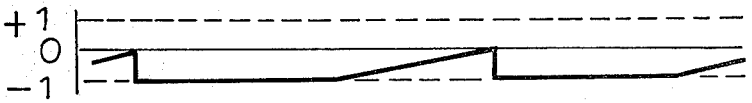

By adding a certain bias voltage to the still pattern at adders 57 and 58, video heads 1 and 2 can trace the $A_1$ track with an on-track condition. A method to obtain such a bias voltage is explained below. In the operational circuit 33, the terminal CP of the counter 65 is connected to input terminal 64, which is being supplied with the sub-control signals Q. The reset terminal of counter 65 is connected to input terminal 63, which is being supplied with the control signals R and counts the sub-control signals Q. Counter 65 counts five sub-control signals Q. The bias voltage corresponding to one pitch of the video track shown in FIG. 3d is obtained from D/A converters 69 and 70, which convert the output signals of counter 65 to the form of analog signals. This bias voltage is supplied to adder 57 and 58. Output terminals 61 and 62 develop the signals shown in FIG. 3e and FIG. 3f, and video heads 1 and 2 can trace the $A_1$ track with an on-track condition.

The phases of video tracks with respect to the video heads 1 and 2 are detected by the control signals R and the sub-control signals Q, which accurately divide the period of the control signal and the signals P which indicate the rotating phase of video heads 1 and 2. Even if the video tracks (that is, the magnetic tape 23) stops at any phase with respect to the rotating locus of video heads 1 and 2, the information of the phase is obtained. The video heads 1 and 2 can trace the tracks with an on-track condition.

Figure 5A:
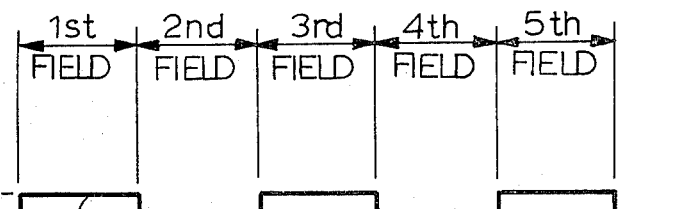
FIGS. 5a-5i illustrate signals appearing at various points of operational circuit 33.
Figure 5B:
Figure 5C:
Figure 5D:
Figure 5E:
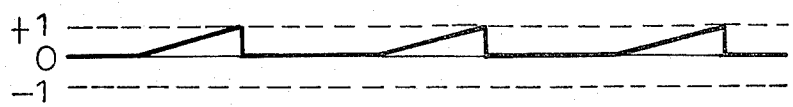
Figure 5F:
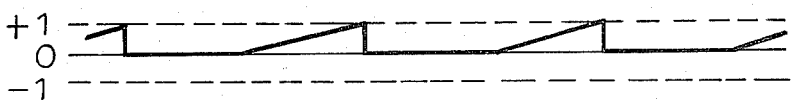
Figure 5G:
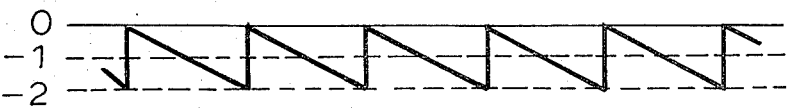
Figure 5H:
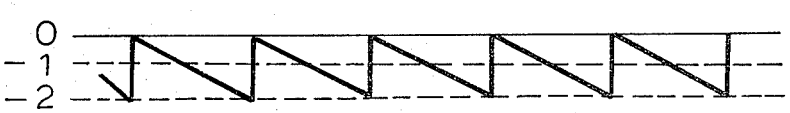
Figure 5I:
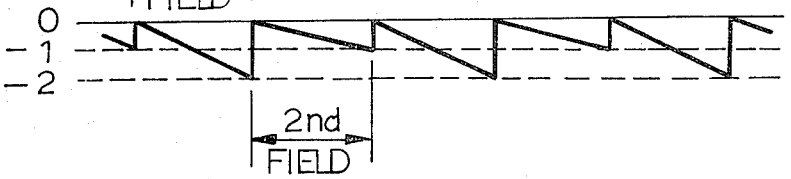

Contained below is an explanation of why the concept described above is valid with an arbitrary tape speed. The case of a playback speed equal to twice the record speed will be used. FIG. 5a shows the signals P which correspond to the rotating phase of video heads 1 and 2. FIG. 5b shows the phase of control signals R. FIG. 5c shows the phase of sub-control signals Q. These signals are applied to input terminals 50, 63, 64 of operational circuit 33. The signals shown in FIG. 5d, FIG. 5e, FIG. 5f and FIG. 5g are developed at the output terminal of D/A converter 55, 56, 69 and 70. These signals are added to adders 57 and 58, and are passed to low pass filters 59 and 60. The signals shown in FIG. 5h and FIG. 5i are obtained at output terminals 61, 62. The scale of the vertical axis of these figures indicate the level which converts the amplitude of the track pitches. The phase relationship shown in FIG. 5a and FIG. 5b indicates that the time of scanning the start point of the $A_0$ track by video head 1 coincides with the time of reproducing the control signal 38 by control head 17.

If the displacing patterns are not supplied to the piezoelectric element 21, the trace end of video head 1 is the end point of the $B_0$ track. That is to say, if the voltage corresponding to a $-1$ pitch of the video track is supplied to piezoelectric element 21 during the first field, video head 1 can trace the video tracks with an on-track condition. FIG. 5h shows that operational circuit 33 develops the voltage corresponding to a $-1$ pitch at the end of the first field. At the start point of the second field, video head 2 traces the start point of the $A_1$ track.

If the deflection patterns are not supplied to piezoelectric element 22, the trace end of video head 2 is the end point of the $B_0$ track. That is to say, if the voltage corresponding to a $-1$ pitch of the video track is supplied to piezoelectric element 22 during the second field, video head 2 can trace the video tracks with an on-track condition. FIG. 5i shows that operational circuit 33 develops the voltage corresponding to a $-1$ pitch at the end of the second field. The example of the double speed playback noted above shows the case in which the rising edge or falling edge of the signals P coincide with the phase of the control signals R.

Figure 6A:
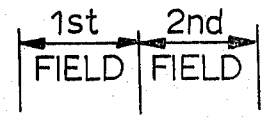
FIGS. 6a-6i illustrate a different state of the signals appearing at the same points as those of FIG. 5.
Figure 6B:
Figure 6C:
Figure 6D:
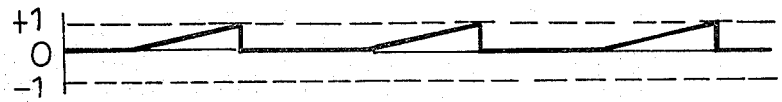
Figure 6E:
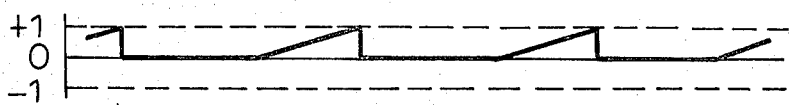
Figure 6F:
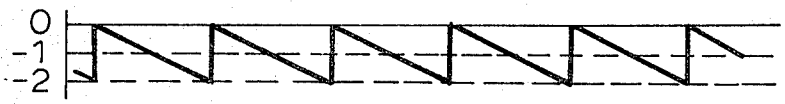
Figure 6G:
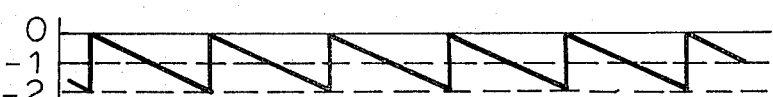
Figure 6H:
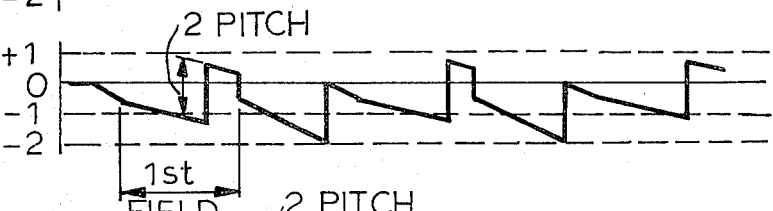
Figure 6I:
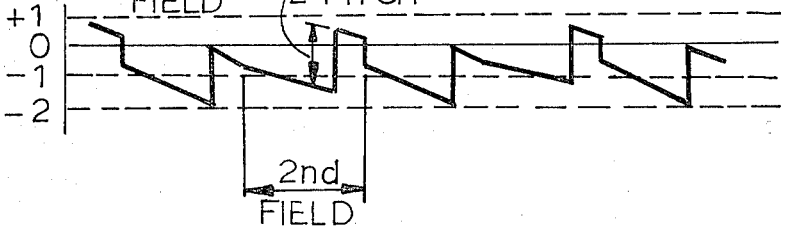

FIGS. 6a–6i show the case in which the phases are shifted during a double speed playback. FIG. 6a, FIG. 6b and FIG. 6c show the phase relationship between the signals P and the control signals R and the sub-control signals Q. When these signals are applied to input terminals 50, 63 and 64, the signals shown in FIG. 6d, 6e, 6f and 6g are developed at the output terminals of D/A converters 55, 56, 69 and 70. The signals shown in FIG. 6h and 6i are supplied to output terminals 61, 62 through adders 57 and 58, and low pass filters 59 and 60. FIG. 6a, 6b and 6c show that the first field begins after three sub-control signals Q are counted. That is to say, the time of the third sub-control signal application coincides with the time when the scanning of the video track by video head 1 starts.

The starting point of the first field shown in FIG. 6h is biased by an amount corresponding to three sub-control signals with respect to that of FIG. 5h. This is the same concept of the still mode playback as when the bias voltage is supplied when the starting point of the scanning of video heads 1 and 2 is offset from the $A_1$ track. The bias voltage is obtained by counting the sub-control signals Q. The operational circuit 23 develops the signals shown in FIG. 6h. During the first half of the field, the video head 1 scans with an on-track condition. During the latter half of the first field, the control signal R is reproduced. Since the counter 65 is reset by the control signal R shown in FIGS. 6f and 6g, a jump whose amount is equal to two video tracks occurs as shown in FIG. 6h. By this jumping, the scanning locus is suddenly shifted from $A_1$ track to $A_2$ track. Since the response of piezoelectric element 21 is sufficiently fast, video head 1 first scans the $A_1$ track with an on-track condition and, during the latter half of the field, scans the $A_2$ track with an on-track condition. As shown in FIG. 6i, during the second field, video head 2 can scan the track with an on-track condition. The phase relationships of the signals P and the control signals R and the sub-control signals Q are valid without regard to the tape speed of the magnetic tape 23. A magnetic head which responds to magnetic fluxes is suitable for the control head 17 to reproduce the control signals R at an arbitrary tape running speed.

As mentioned above, the phases of the video tracks with respect to the video heads are indicated by the reproduced control signals, the sub-control signals and the rotating phase of the video heads. The sub-control signals accurately divide the internal of the control signals. Since the mechanical positions of the video heads are displaced by the phase information to scan the video tracks, the video heads can trace the video tracks with an on-track condition regardless of the tape speed. Thus, the reproduced pictures have no noise bars.

Figure 7:
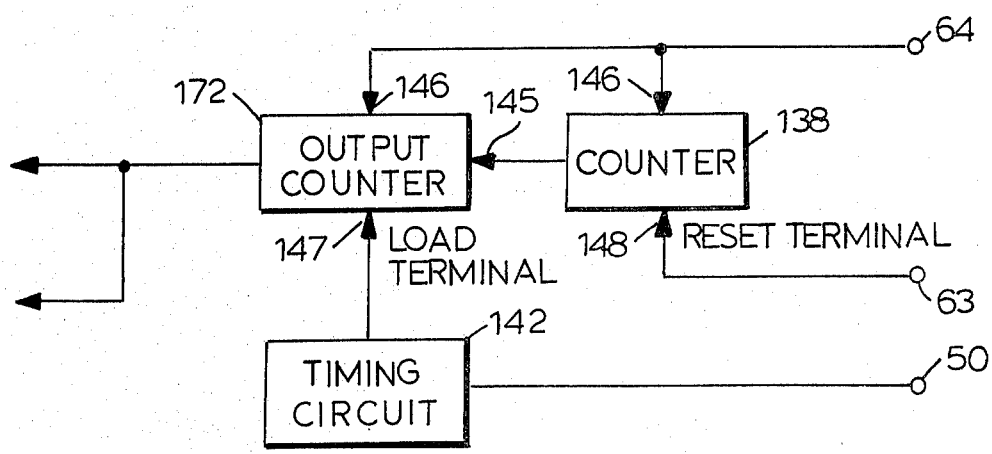
FIG. 7 is a block diagram of a modified counter means usable in this invention.

The jumping from the $A_1$ track to the $B_1$ track, as described above, can possibly occur within a period of a field. When an electromechanical conversion element (piezoelectric element) does not have a sufficiently fast response, a limited time period is necessary for the above noted jumping. Such a time period becomes a cause of noise on the TV screen. A technique for obtaining a noiseless reproduction image even in the case of such an electromechanical conversion element having an insufficient response is described below. Briefly, the concept entails the adding of a limitation to the counter 65 such that no jumping occurs within the time period of any one reproduction field. FIG. 7 shows an example of a counter having such a limitation.

Referring to FIG. 7, output counter 172 and a timing circuit 142 are provided, in addition to a counter 138 which functions in the same manner as the counter 65 of FIG. 4. Output counter 172 is preset with the output of counter 138 in accordance with the timing provided by timing circuit 142. Output counter 172 then counts the above-described sub-control signals Q, and is reset by the above control signals R. Timing circuit 142 is driven by the rising and falling edges of the input P signals from input terminal 50 for producing pulse signals S, which provide the preset timing of output counter 172.

Reference numeral 146 is a count input terminal CP of the counters, 145 is a preset data input terminal, 147 is a load terminal, and 148 is a reset terminal. Output counter 172 is connected to D/A converters 69, 70 of FIG. 4.

FIGS. 8a–8i show the signal waveforms at various points of the circuit of FIG. 7. FIGS. 8a, 8c, 8d, 8e respectively correspond to FIGS. 6a, 6d, 6e, and 6f. FIG. 8b shows the output pulse signals S of timing circuit 142 of FIG. 7. FIG. 8f shows the output signals of output counter 172 preset by the counter output values of counter 138 of FIG. 8e in accordance with the timing of the output pulse signals S of FIG. 8b. These output signals are added at adders 57, 58 to the output signals of D/A converters 55, 56 (namely, the still pattern shown in FIGS. 6d and 6e via D/A converters 69, 70 of FIG. 4. Thus, signals as shown in FIGS. 8g and 8h are obtained at output terminals 61, 62 of FIG. 4. The differences between these signals and the signals of FIGS. 6h and 6i are that in the case of FIG. 8, the timing of two-pitch jumping is limited to each edge of the P signals (namely, the instances when the pulse signals S are generated). Since two-pitch jumping of the electromechanical conversion elements 21, 22 occurs within the vertical retracing period of the reproduced video signals, such jumping does not cause any observable noise on the TV screen even if the electromagnetic conversion element does not have a very fast response.

A technique for eliminating noise even during the vertical retracing period is described below. Noise during the vertical retracing period does not appear on a CRT screen. However, since such noise is in the vicnity of vertical sync signals, a synchronizing circuit contained in a television receiver (not shown) is likely to be mistriggered. Furthermore, if the electromechanical conversion elements 21, 22 have a large mechanical resonance, the above two-pitch jumping is likely to also influence the CRT screen, and not only during the vertical retracing period.

Figure 9:
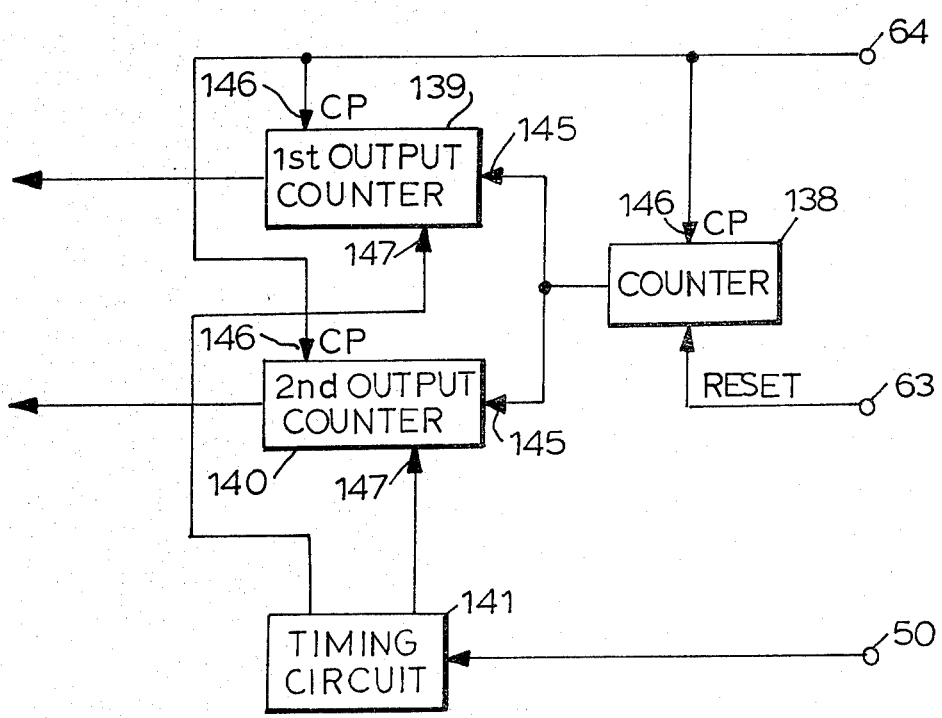
FIG. 9 illustrates a circuit for setting the timing of two-pitch jumping at a point in time before the beginning of each field.

A technique for setting the timing of two-pitch jumping at a point in time before the beginning of each field is described below as a technique to overcome the above-noted problems. As shown in FIG. 9, such technique is represented by an arrangement comprising a counter 138, a first output counter 139, a second output counter 140 and a timing circuit 147. The output signals of the first output counter 139 are applied to D/A converter 69 of FIG. 4, and the output signals of the second output counter 140 are applied to D/A converter 70.

Waveforms appearing at various points of the circuit of FIG. 9 are shown in FIGS. 10a–10j. In the case of FIG. 9, the period in which the jumping is to be carried out is set at a point at least ½ field before the beginning of the field. This period is the H level period in FIGS. 10b and 10c, and these signals are individually applied to the two magnetic heads. These signals are generated by timing circuit 141. FIGS. 10a, 10b, 10e, and 10f respectively correspond to FIGS. 8a, 8c, 8d.

Figure 10A:
FIGS. 10a-10j show the signal waveforms at various points of the circuit of FIG. 9.
Figure 10B:
Figure 10C:
Figure 10D:
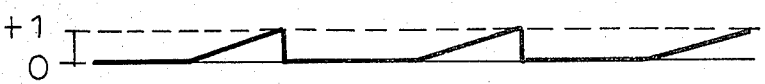
Figure 10E:
Figure 10F:
Figure 10G:
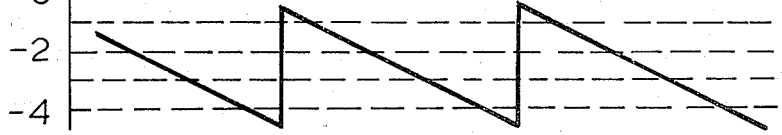
Figure 10H:
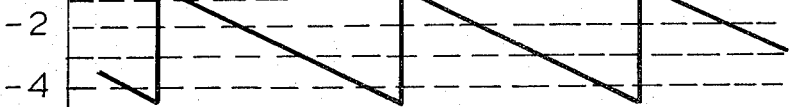
Figure 10I:
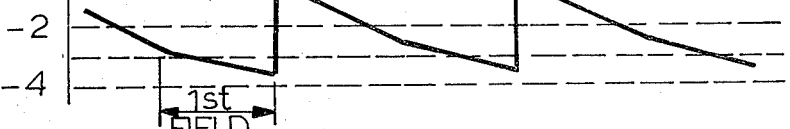
Figure 10J:
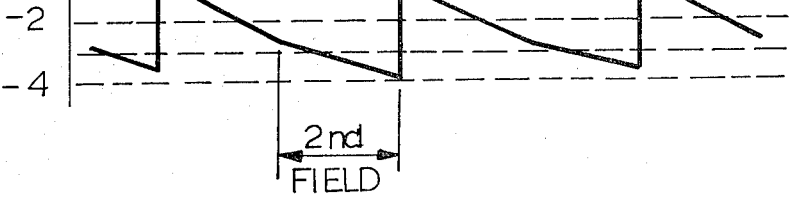

The output signals of the first output counter 139 and the second output counter 140 are those shown in FIGS. 10g and 10h. These outputs are added to the signals of FIGS. 10d and 10e by A/D converters 55, 56 of FIG. 4 just as in the case of FIGS. 6f and 6g (namely, the still pattern), so that signals as shown in FIGS. 10i and 10j are obtained at output terminals 61, 62. As apparent from FIGS. 10i and 10j, the jumping occurs at a point one field before the field begins. This is because the jumping of counter 138 by the control signals occurs outside the jumping performing periods of FIGS. 10b and 10c. When the jumping of counter 138 occurs in the H level periods of FIGS. 10b and 10c, then at the same time the jumping occurs in the output counters 139, 140. However, the jumping does not occur at a position after ½ field before the beginning of the field even when the control signal is inputted during any phase relationship with the P signals. So, the slow response of the electromechanical conversion elements 21, 22 or the ringing thereof does not influence the field.

In the above descriptions, the period for performing the jumping is set between one field before and ½ field before the beginning of the field. However, the end of such a period can be extended to 1/10 field from the above-described ½ field if the electromechanical conversion elements 21, 22 have fast responses, and the ringing phenomenon is negligible.

What is claimed is:

1. A tracking system for video recorders/reproducers employing a record medium having tracks for recording video signals and for recording control signals which are representative of the record position of said video signals, said system comprising:

- a transducing means for reproducing video signals recorded along said track on said record medium;
- a positionable means having said transducing means mounted at a location thereon, said positionable means being movable at said location for displacing the position of said transducing means;
- a control signal reproducing means for reproducing said control signals recorded along at least one of said tracks on said record medium;
- a means for dividing the interval of said control signals, said dividing means generating sub-control signals which are representative of the transported length of said record medium;
- a rotating phase detector for detecting the rotating phase of said transducing means;
- an operational means for generating a displacement pattern signal which is representative of the location of said video track recorded on said record medium with respect to said transducing means by using the output of said control signal reproducing means, said sub-control signals, and the output of said rotating phase detector; and
- a means for supplying said displacement pattern signal to said positionable means, whereby said transducing means is capable of tracking properly on said recorded video track regardless of the transporting speed of said record medium.

2. A tracking system as claimed in claim 1, wherein said dividing means comprises a rotary disk which rotates in correspondence with thr transporting of said record medium and a pulse generator for generating pulse signals in proportion to the rotational angle of said rotary disk, said pulse signals used for generating said sub-control signals.

3. A tracking system as claimed in claim 1, wherein said control signal reproducing means comprises a magnetic head which responds to magnetic flux.

4. A tracking system as claimed in claims 1, 2 or 3, wherein said operational means comprises: a still pattern generator, reset by said output of said rotating phase detector, for generating a still pattern signal whose amplitude is equal to zero at the beginning of a scanning by said transducing means and whose amplitude corresponds to one track pitch of said video track at the end of said scanning by said transducing means; a counter for counting said sub-control signals and for generating bias signals during a still mode of operation of said system; and an adder for adding an output of said still pattern generator and the output of said bias counter and for generating said displacement pattern signal.

5. A tracking system as claimed in claim 4, wherein said operational means further comprises a timing circuit and at least one additional counter operatively connected to said bias counter for delaying the operation of the means for supplying said displacement pattern signal to said positionable means such that said displacement pattern signal fed to said positionable means is delayed.

* * * * *